Miguel Torrebiarte Sohanin
INVENTOR.

May 23, 1950 M. T. SOHANIN 2,509,175
DRYING MACHINE
Filed Oct. 16, 1946 3 Sheets-Sheet 2

Miguel Torrebiarte Sohanin
INVENTOR.

BY James H. Littlepage
ATTORNEY

Patented May 23, 1950

2,509,175

UNITED STATES PATENT OFFICE 2,509,175

DRYING MACHINE

Miguel Torrebiarte Sohanin, Finca Magdalena,
Coban A. V., Guatemala

Application October 16, 1946, Serial No. 703,497
In Guatemala September 12, 1946

3 Claims. (Cl. 34—102)

This invention relates to drying machines of the gravity-flow type which, while useful for drying all sorts of grains, beans, and the like, have particular utility in the drying of coffee beans.

The primary object of the invention is to provide a machine having a hopper with inclined bottom surfaces upon which coffee beans are deposited and allowed slowly to slide down, the surfaces being not only heated by hot air in a chamber below, but also supporting a plurality of upstanding perforate tubes extending upwardly at spaced intervals for distributing the warm air from a chamber below through the shifting, sliding mass of beans so as to drive off moisture. It is further intended to feed the beans, as they are allowed to drop from the inclined surfaces, into the chamber below, in which further drying occurs, and from which the beans are slowly jostled and expelled by a screw, whence they are passed to a recycling elevator and chute, and again into the hopper.

More broadly it might be stated that the object of the invention is to provide for slowly moving a shifting mass of material along an inclined surface and for injecting a drying medium, such as hot air into the shifting mass at laterally and vertically spaced intervals.

A more particular object is to provide a material drying machine having a hopper with a bottom of inverted V-shape, a plurality of perforated tubes extending through and upwardly from the hopper bottom, a hot air chamber below the bottom having side walls spaced from the lower edges of the hopper bottom to provide a gap therebetween, and a pair of elongated paddle wheels respectively disposed in the gaps, not only for controlling the speed at which the mass of material moves along and drops from the edges of the inclined bottom of the upper but also, in cooperation with the material passing through the gaps, for maintaining a satisfactory air pressure differential between the chamber and the hopper so that air will pass out the perforations in the tubes and into the mass of beans sliding down the hopper bottom.

In addition it is now proposed to provide, beneath the hopper having free edges from which the beans drop, a hot-air chamber for supplying air to the hopper ventilating elements, or perforate tubes, the chamber having a V-shaped bottom for catching the beans dropping from the hopper so that the beans are further dried as they drop into the chamber and slide along the inward inclinations of its bottom to a screw conveyor.

As a further object, it is intended now to provide drying apparatus in which the largest masses of material undergoing constant treatment are moved along wide, inclined planes, on which the weight loads are almost static, in contrast with prior art gravity operated dryers wherein a relatively small stream of material is dropped pellmell along a zigzag or even almost straight vertical path. While relatively large masses are treated simultaneously, nevertheless it is a particular object to provide constant and universal ventilation, not only to drive off moisture but also to avoid cooking of the material. It is noteworthy, also, that in the first run the material is first passed through the hopper having the perforate tubes extending upwardly through the shifting mass so that the external moisture is first driven off by the hot air blasting through the perforations, this moisture being carried up and away to the exterior without contact with any other of the material than the relatively small and inconsequential stream flowing into the hopper. In all conditions under which the material is subject to heat it is intended that it be constantly moved, jumbled, and subjected to a stream of air.

Among other objects is the provision of a drying machine which may be transported, either as an entirety or as an easily, dis-assembled and assembled group of components, and set up for running in regions remote from any source of machinery but close to the source of material to be dried, without the necessity of elaborate foundations, and without expert maintenance of the machine or monitoring of the drying process performed thereby. Another feature is the easy replacement of the surface members subject to deterioration resulting from the combined actions of heat, and abrasion by the treated material.

These and other objects will be apparent from the following specification and drawings, in which.

Figure 1:
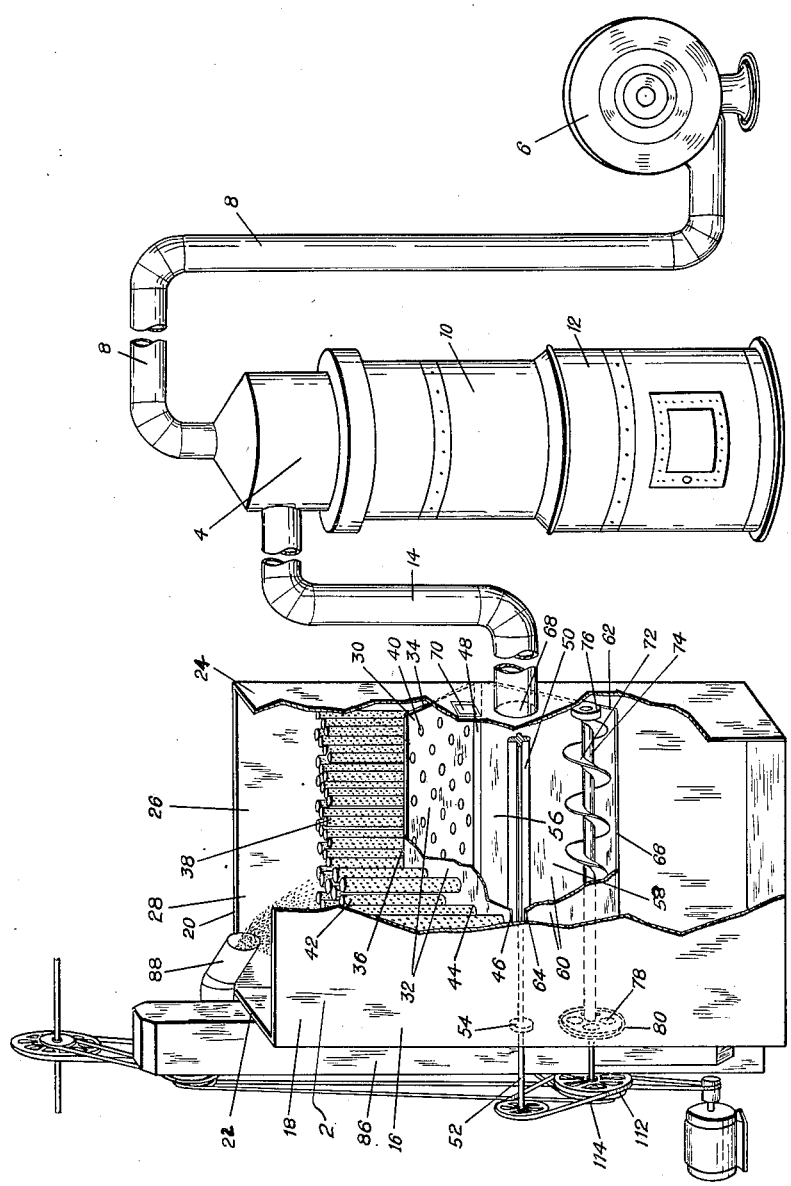
Fig. 1 is a front elevation, partially broken away, illustrating the assembly.
Figure 2:
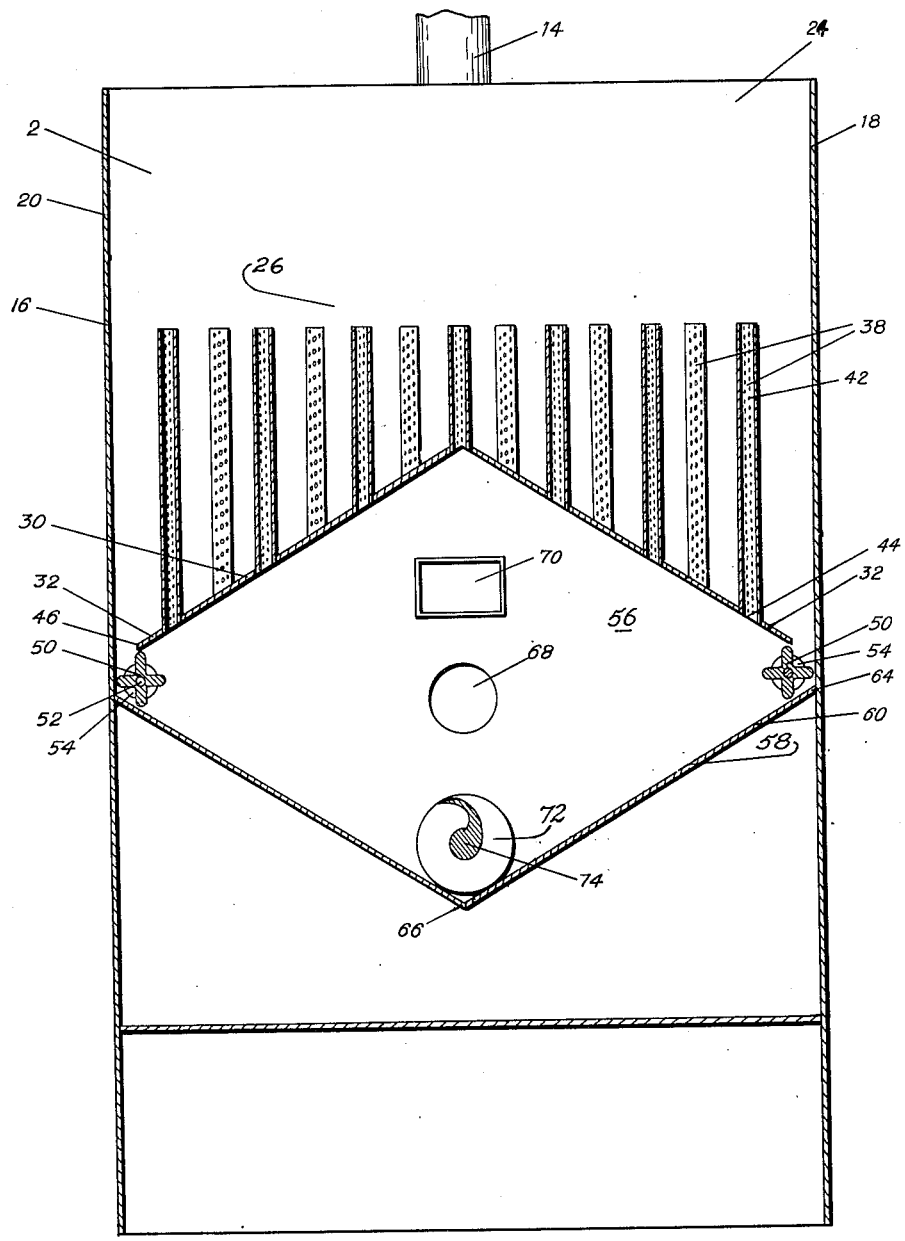
Fig. 2 is a cross-section taken vertically through the drier.
Figure 3:
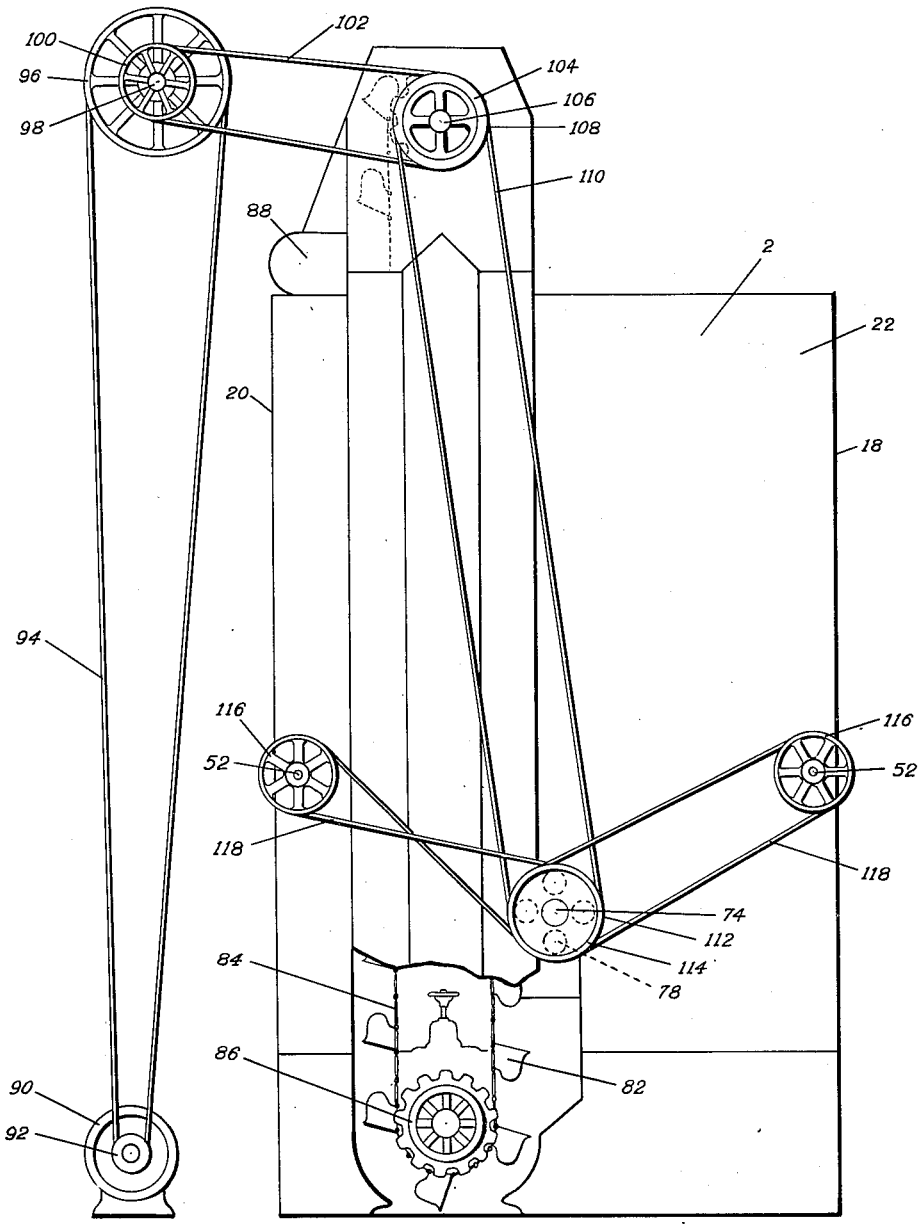
Fig. 3 is a side elevation illustrating the transmission.

Referring now to the drawings, in which like reference numerals denote similar elements, the apparatus will be described in connection with its use for drying coffee beans, although it is to be understood that it might well be used for drying any granular material such as beans, grain, or even inorganic matter, and that gas or vapor other than hot air could be used.

In brief, dryer 2 is connected to a source 4 of hot air under pressure which passes first into a chamber 56, generally diamond-shape in cross-section, and upwardly through perforated tubes 38 which extend upwardly through an inverted V-shape bottom 30 of hopper 26, through the shifting mass of beans, and thence out open top 28 to the atmosphere. Beans slide down bottom 30, are allowed, by paddle wheels 50 to drop off onto the V-shape bottom 58 of chamber 56, along which they slide to screw conveyor 72, are extruded to elevating conveyor 86, and then dumped back into hopper 26 to repeat the cycle until the beans are dried sufficiently.

The elevating conveyor 86 is conventional, and the details form no part of this invention. In conventional conveyors of this type, there are several expedients for discharging the work when completed. If it is desired to deliver the work at the bottom, an outlet is provided or, if at the top a switch chute arrangement duplicating chute 82 but extending to the side of the hopper may be used. In the latter instance, removable gates are insertible for blocking either chute.

The source 4 of hot air for drier 2 includes an air compressor 6 driven by a suitable source of power (not shown) which forces air through a pipe 8, through the heat-exchange section 10 of a furnace 12, and thence through pipe 14 into drier 2.

Drier 2 includes a generally oblong open-top casing, preferably formed of sheets of metal comprising front and rear walls 18 and 20, and left and right side walls 22 and 24 suitably secured together along their edges to form a fairly air-tight enclosure, this enclosure being divided into two essential portions, namely, the hopper 26 and the hot air chamber 56.

Hopper 26, into which the beans are initially poured, has an open top 28 and a bottom 30 formed of two inclined plates 32, 32, preferably of sheet metal secured by their end edges 34 to side walls 22 and 24. The inner edges 36 of plates 32 are joined so that the plates form an inverted V, somewhat in the nature of a pitched roof.

Tubes 38 rigidly secured in holes 40 in plates 32 are formed with perforations 42 so that hot air entering their open lower ends 44 will pass therethrough. It is of importance that tubes 38 are disposed at frequent lateral intervals in plates 32 and that perforations 42 are closely spaced around the entire circumferences and along the entire lengths of the tubes so that hot air is injected throughout the avalanche of beans sliding along bottom 30.

The side edges 46 of plates 32 are spaced from front and rear walls 18 and 20 of casing 16 to define elongated gaps 48 therebetween, these gaps being controlled by elongated paddle wheels 50 having shafts 52 rotatably supported in bearings 54 affixed in side walls 22 and 24 so that, as the paddle wheels are turned by the mechanism hereinafter described, the beans are allowed to drop from hopper 26 into a hot air chamber 56.

Hot air chamber 56 is vertically defined by the inverted V-shape bottom 30 of the hopper, and its own V-shape bottom 58, the latter being formed by two flat plates 60 of sheet metal secured along their end edges 62 to side walls 22 and 24, along their outer edges 64 to front and rear walls 18 and 20, respectively, and together along their inner edges 66. Chamber 56 receives the hot air from pipe 14 through an opening 68 in right-side wall 22. A closable window 70 is also provided in right-side wall 22 for inspecting the interior of chamber 56, which is generally diamond-shaped in cross-section.

A screw conveyor 72 having a shaft 74 rotatably mounted in bearings 76 in side walls 22, 24 is disposed in the crotch of V-shaped bottom 58 so that the beans falling into chamber 56 are worked along the bottom and out through an apertured disk 78 affixed on shaft 74 and rotating in an opening 80 in left-side wall 24.

Upon extrusion by screw conveyor 72, the beans fall into buckets 82 on the belt 84 an elevating conveyor 86, the details of which form no part of the invention. Upon elevation by conveyor 86, the beans are dumped into a chute 88 and thus returned to hopper 26, this recycling being continued until the drying process is completed.

Power for the various driven elements is obtained from a motor 90 driving, via pulley wheel 92, belt 94, pulley wheel 96, counter-shaft 98, pulley wheel 100, belt 102 and pulley wheel 104 the drive shaft 106 for elevating conveyor 86. Drive shaft 106 drives, via pulley wheel 108 and belt 110 a pulley wheel 112 on the external end of shaft 74 of screw conveyor 72. Finally, pulley wheels 114 on shaft 74 drive pulley wheels 116, 116, on the external ends of paddle wheel shafts 52 via belt 118, 118, one of which is twisted so that the paddle wheels turn oppositely. It is to be understood that the various drive shafts are all rotatably supported by a suitable framework, not shown. If desired, the paddle wheels may be driven to oscillate by suitably gearing well known in the art, and various other power drives may be used instead of the belt system shown.

The invention embodied in the apparatus detailed above is not limited to the specific form disclosed, but is intended to cover all modifications and equivalents within the scope of the following claims.

I claim:

1. In a device of the type described, a casing having side walls and an open top, a pair of flat sheets of metal oppositely inclined with respect to one another and joined together along adjacent edges to form the ridge of a partition substantially of inverted V-shape in cross-section disposed across said casing below said open top to define the bottom of an open-topped hopper within said casing, another pair of flat sheets of metal oppositely inclined with respect to one another and joined together along adjacent edges to form the trough of a partition disposed across said casing below the first to define a chamber below said hopper, the lower edges of the first partition being respectively spaced from the side walls whereby to define passages between said hopper and chamber, elongated paddle wheels rotatably disposed in said passages, means for rotating said paddle wheels whereby to pass material through said passages from said hopper to said chamber, the first partition having a plurality of holes therethrough, pipes having perforated side walls respectively mounted in said holes so as to extend upward from the surfaces of the first partition, the lower ends of said pipes being open and communicating with said chamber, means for admitting air to said chamber, a horizontal conveyor disposed in said trough and communicating with the exterior of said casing, and means for driving said conveyor.

2. In a device of the type described, a casing having side walls and an open top, a pair of flat sheets of metal oppositely inclined with respect to one another and joined together along adjacent edges to form the ridge of a partition substantially of inverted V-shape in cross-section disposed across said casing to define an open-topped hopper, another pair of flat sheets of metal oppositely inclined with respect to one another and joined together along adjacent edges to form the trough of a partition disposed across said casing below the first to define a chamber below the hopper, the lower edges of the first-mentioned partition being respectively spaced from the side walls to define horizontally elongated passages between said hopper and chamber, elongated paddle-wheels rotatably disposed in said passages for controlling the passage of material therethrough, means for controllably rotating said paddle wheels, there being a plurality of openings disposed at spaced intervals through the first partition, tubes having perforated side walls affixed in said openings so as to intercept material moving along the hopper bottom, said tubes having open lower ends communicating with said chamber, means for charging said chamber with warm air under pressure, means for discharging material from said chamber, and elevating conveyor means for recharging said hopper with the discharged material.

3. In a device of the type described, a casing having side walls and an open top, a pair of flat sheets of metal oppositely inclined with respect to one another and joined together along adjacent edges to form the ridge of a partition substantially of inverted V-shape in cross-section disposed across said casing to define an open-topped hopper, another pair of flat sheets of metal oppositely inclined with respect to one another and joined together along adjacent edges to form the trough of a partition substantially V-shaped in cross section disposed across said casing below the first whereby to define a chamber below the hopper, the lower edges of the first-mentioned partition being spaced from the side walls to define horizontally elongated passages between said hopper and chamber, the upper longitudinal portions of said hopper bottom being respectively disposed below said passages, elongated paddle wheels rotatably disposed in said passages, a screw conveyor rotatably disposed in the lower portion of said chamber, means for rotating said paddle wheels and said conveyor means for recharging said hopper with granular material, there being a plurality of openings disposed at spaced intervals through said hopper bottom, tubes having perforated side walls affixed in said openings, said tubes having open lower ends extending into said chamber, and means for charging said chamber with warm air under pressure, whereby to dry the material in said chamber while injecting warm air into the material on said hopper bottom through said perforated tubes.

MIGUEL TORREBIARTE SOHANIN.

REFERENCES CITED

The following references are of record in the file of this patent:

UNITED STATES PATENTS

| Number | Name | Date |
|---|---|---|
| 633,221 | Sorlle | Sept. 19, 1899 |
| 767,594 | Penagos | Aug. 16, 1904 |
| 940,144 | Geiger | Nov. 16, 1909 |
| 1,058,291 | Dennis | Apr. 8, 1913 |
| 1,219,816 | French | Mar. 20, 1917 |
| 1,474,683 | Morton | Nov. 20, 1923 |
| 2,049,199 | Dornfeld | July 28, 1936 |

FOREIGN PATENTS

| Number | Country | Date |
|---|---|---|
| 490,585 | France | Jan. 4, 1919 |